INVENTOR.
J. Venn Leeds, Jr.

March 1, 1966   J. V. LEEDS, JR   3,238,370
AUTOMATIC CORRECTION OF NUCLEAR INSTRUMENT
TO COMPENSATE FOR NEUTRON ATTENUATION
Filed Oct. 17, 1962
2 Sheets-Sheet 2

INVENTOR.
J. Venn Leeds, Jr.
BY
ATTORNEY.

United States Patent Office 3,238,370
Patented Mar. 1, 1966

3,238,370
AUTOMATIC CORRECTION OF NUCLEAR INSTRUMENT TO COMPENSATE FOR NEUTRON ATTENUATION
J. Venn Leeds, Jr., Pittsburgh, Pa., assignor, by mesne assignments, to the United States of America as represented by the United States Atomic Energy Commission
Filed Oct. 17, 1962, Ser. No. 231,307
7 Claims. (Cl. 250—83.1)

This invention relates to electrical measuring apparatus and more particularly relates to measuring apparatus which may be compensated or otherwise controlled by a selected factor so that an electrical output signal is provided which is a product function of both the actual measured quantity and the correction or compensating factor whereby the output signal represents the true value of the quantity desired to be measured.

One particular application of this invention relates to the measurement of the power output from a nuclear reactor. It is known that such reactor power is directly related to the neutron flux which is the product of neutron density and neutron velocity and is therefore the number of thermal neutrons per centimeter squared per second instantaneously present in the reactor. Accordingly, the measurement of neutron density or flux within the reactor gives a rapid indication of reactor power level and sudden changes in such power level. As a result of such rapid response, such neutron measuring apparatus is highly desirable in reactor control and is preferable over calorimetric power or other measuring apparatus particularly at low power levels.

In the well known pressurized water reactor, a source of fissionable material, e.g., uranium produce neutrons which are thermalized by the pressurized water moderator to form a chain reaction which releases substantial energy in the form of heat. The heat generated both in the moderator and the fissionable source is obtained by the flow of water under pressure so that high temperature changes in the water may be obtained without vaporization of the water thereby permitting use of the water in a turbine directly. However, in this process, the water also attenuates the velocity of the neutrons emitted from the source thereby varying the measured neutron flux or density so that the true measure of the actual power of the reactor must be compensated or corrected for this attenuation factor.

This invention provides for accurate measurement of power by measuring both neutron density and/or flux and coolant temperature. The neutron measuring apparatus may be of a type which indicates neutron flux directly because of its long time constant or may be of a type which measures only neutron density and has an associated integrating or counting circuit to determine the neutron flux. In either event, an electrical signal from the neutron measuring device is amplified in an operational amplifier having a negative feedback circuit including a Hall effect device; the Hal effect device is further controlled by the temperature signal so that the overall gain of the amplifier is varied by the variation of the water temperature whereby the amplifier output signal is a product function of the input signal of neutron density and the inverse of the temperature signal. By selecting a temperature signal and a specific function of this temperature signal which represents the inverse of the neutron attenuation factor of the water at that temperature, the amplifier output signal has a value which is a product of measured neutron flux and neutron attenuation in the water which is a measure of true power.

While such an application as mentioned above is an important aspect of the invention from another aspect, the invention is a variable gain amplifier using all static components in which the gain is varied by control of a Hall effect device in the feedback path. Since the invention has many aspects other than those mentioned above, these aspects are defined in the following objects:

It is an object of this invention to provide improved neutron measuring apparatus.

It is another object to provide improved reactor power measuring apparatus.

It is another object to provide improved electrical circuitry for multiplying two electrical signals.

A still further object of this invention is to provide a variable gain operational amplifier by the use of controlled feedback through a Hall effect device whereby the amplifier output is a function of both its input and a control signal applied to the Hall device.

A still further object is to provide measuring apparatus which may be easily compensated with static devices.

These and still further objects are provided by the following disclosure of which:

Figure 1:
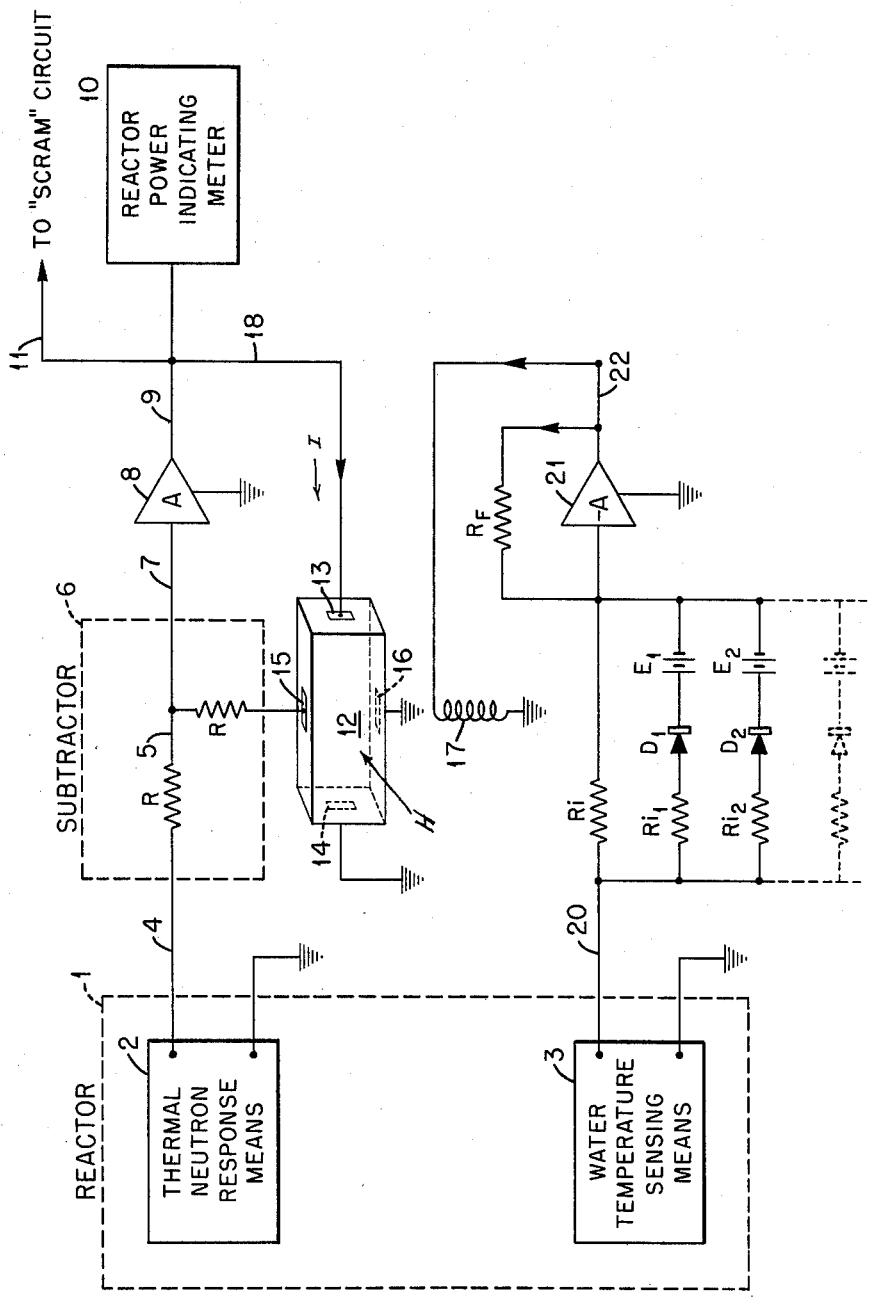
FIG. 1 illustrates my invention partly in block diagram and partly in schematic form.

In FIG. 1 there is shown a reactor 1 in dotted lines which may be of any type but in one example is a pressurized water reactor.

Associated with the reactor are a thermal neutron responsive means 2 which may be any well known type and may be an ion chamber or a $BF_3$ boron trifluoride detector for example and a water temperature sensing means 3 which may be a thermocouple or resistance thermometer.

The neutron responsive means 3 in addition to the detector may include an amplifier and an electronic binary counter or other integrating network as is well known to provide an output signal on line 4 (with respect to ground) proportional to the neutron flux in the reactor. This signal is passed through resistor 5 of the subtractor 6 to the input 7 of a high gain operational amplifier 8. Of course, where ion chamber and other self integrating type measuring apparatus is used, this additional electronic circuitry is not necessary.

An operational amplifier as shown at 8 may be of the type shown on page 284 in "Control of Nuclear Reactors and Power Plants," by Schultz (1955). Such amplifiers are direct coupled with a gain of the order of 1000 or more and utilize negative feedback for stability of operation. In addition, the circuitry including the feedback must have a flat frequency response so that the stability is not destroyed by oscillation which could result at some frequency where the frequency response resulted in positive (rather than negative) feedback. Also, such amplifiers have a high input impedance and a low output impedance to prevent adjacent amplifier stages from loading the operational amplifier to produce oscillation. This impedance requirement is usually provided by using cathode followers (emitter followers for semiconductors) as both the input and output tubes of the operational amplifier.

The amplifier output on line 9 is fed to the reactor power indicating meter 10 and over line 11 to conventional "scram" circuits. A "scram" circuit is an alarm or control circuit which is operated when danger exists.

A Hall effect device 12 includes a thin rectangular block of high resistance semiconductive material preferably indium arsenate or indium ammoniate (of the order of 10 ohm-cm.) having ohmic imput contacts at 13 and 14 on opposite end of 12 and ohmic output contacts 15 and 16 on opposite sides of 12.

A coil 17 is arranged to produce a magnetic field H going into the drawing perpendicular to the plane of Hall plate 12 and all its associated ohmic contacts so that this magnetic field is perpendicular to the front or rear broad surfaces of the semi conductor as shown for illustration.

The output signal of amplifier 8 is connected from line 9 over line 18 to the Hall input electrode 13 for flow through the Hall plate 12 to grounded Hall electrode 14. This flow of current in cooperation with the magnetic field perpendicular to this flow, produces a voltage between electrodes 15 and 16 which is either A.C. or D.C. as desired and whose value is the instantaneous product of the magnetic field strength H and the input signal current I. If the magnetic field is A.C. the output signal at 15 and 16 is A.C. while a D.C. output is provided if the magnetic field is constant. The control of the magnetic field at 17 by the water temperature will be discussed hereinafter.

The feedback through the Hall plate from line 18 produces a signal at the input line 7 of amplifier 8 which is negative feedback as is required for operational amplifiers. This occurs because the output signal on line 18 is the same phase or polarity as the input to the amplifier (by the proper selection of the number and type of amplifier stages or by selection of the proper direction of the magnetic field H as is well known) so that the output from Hall output electrode 15 is the same polarity as the input at 4. Since the two resistors R at the amplifier input form a subtractor, the input to the amplifier on line 7 is the arithmetic difference between the signals at 4 and 15. If needed an addition amplifier may be inserted between 15 and its resistor to provide the proper polarity and signal strength.

The difference signal on line 7 is usually referred to as an error signal which is always small and always tends to approach zero. For example, if the neutron flux measurement increases, the signal on line 4 increases to provide a greater output on lines 9 and 18 to provide a greater feedback signal at 15 to thereby reduce the input error signal on line 7. While this error signal tends to be small, it is not constant and indeed does vary directly with the neutron density measured for any particular amplifier gain.

However, it is obvious that if the magnetic field at coil 17 is varied, the feedback signal at 15 will vary proportionately so that the error signal on line 7 will vary proportionately as will the output reading at 10.

Since it may be shown that the gain of such an operational amplifier is approximately the ratio of the feedback impedance RF to the amplifier input impedance R, where the feedback impedance is very large, the variation of the Hall plate output at 15 by variation of the magnetic field at 17 is equivalent to a variation in amplifier gain since the feedback impedance is varied; consequently if the magnetic field is controlled by the water temperature, the gain of the amplifier is varied by the water temperature variation.

Having described the operation of amplifier 8 we will now refer to the temperature sensing apparatus. As the water temperature increases the value of the water temperature sensing signal on line 20 increases directly. Assume that the signal on line 20 is sufficiently low so that diodes $D_1$ and $D_2$ are non conducting as a result of the back biasing by batteries $E_1$ and $E_2$; in this example the gain of amplifier 21 which is another operation amplifier is $RF/Ri$ and the amplifier output on line 22 is $e_0 = e_{in} RF/Ri$ where $e_{in}$ is the temperature voltage on line 20. As the temperature increases, diode $D_1$ conducts and the amplifier gain is now $$\frac{Rf}{\frac{Ri \cdot Ri_1}{Ri + Ri_1}}$$

while the output voltages becomes $$-e_0 = e_{in} \frac{Rf}{\frac{Ri \cdot Ri_1}{Ri + Ri_1}}$$

Figure 2:
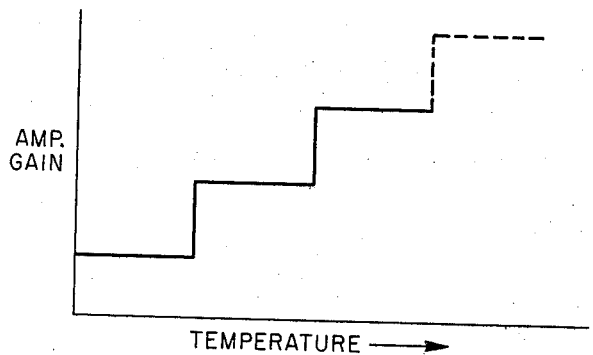
FIGS. 2–4 are graphs relating to the operation of my invention.

Thus as the temperature increases to different levels, succeeding diodes will successively become conductive thereby lowering the input impedance to increase the gain of amplifier 21 in steps as shown in FIG. 2. Of course more diodes could be used to provide a smoother gain variation in FIG. 2 or else the feedback impedance RF could be varied by a temperature signal as for example by using another Hall plate in place of resistor RF since either the input impedance or feedback impedance may be varied to vary the gain of the operational amplifier.

Figure 3:
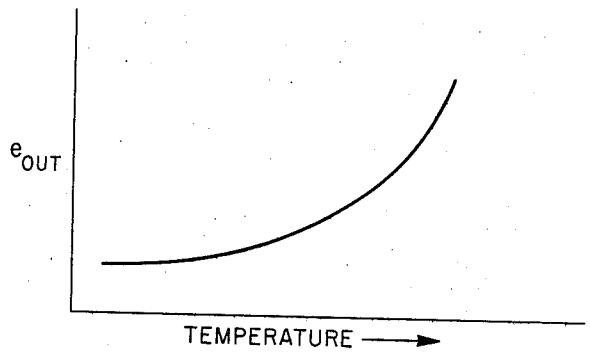

Now referring to FIG. 3, this curve shows that the electrical output signal from amplifier 21 is a continuous substantially smooth function even though the gain of the stage may vary in steps as shown in FIG. 2, since the output signal from 21 is the product of a linear input signal and the gain signal.

Figure 4:
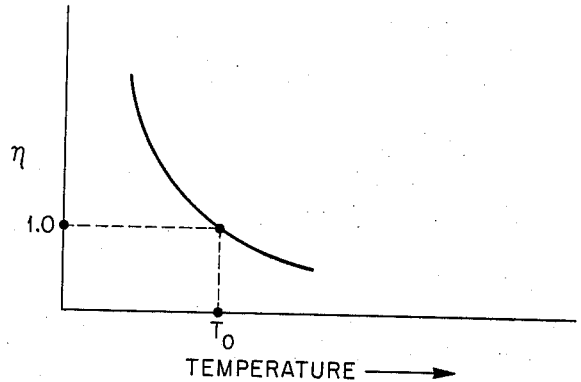

FIG. 4 shows the effect in a pressurized water reactor of water temperature on neutron attenuation. As the temperature increases, the water moderator becomes less dense so that fewer neutrons are attenuated. In this regard, it should be noted that in FIG. 3 amplifier 21 provides an electrical output which is the inverse of the neutron attenuation in FIG. 4. Therefore, as the water temperature decreases so that more and more neutrons will be attenuated by the water, the output of amplifier 21 decreases to thereby provide a smaller magnetic field at 17 which results in a small output at 15 of the Hall plate (less to be subtracted) which causes a larger error signal on line 7 thereby providing a greater output reading on meter 10 to indicate that the actual reactor power is greater than that actually detected by the neutron responsive means 4. Since a smaller electrical output from amplifier 21 provides a greater electrical output from amplifier 8, the inverse of FIG. 3 would represent the output of amplifier 8 with temperature; this clearly shows that the output of amplifier 8 is a direct function of the neutron attenuation as seen in FIG. 4.

Consider now the following mathematical analysis:

Let $e_n$ = the neutron flux voltage on line 4
$e_X$ = output from Hall plate at 15
$e_T$ = the temperature voltage on line 20
$e_{TO}$ = temperature output voltage on line 22; that is proportional to the magnetic field H at 17.
$A_1$ = gain of amplifier 8
$A_2$ = gain of amplifier 21
$e_{in}$ = voltage at 7 as input to amplifier 8
$e_{out}$ = voltage on line 9 as output from amplifier 8
$e_{out} = A_1 e_{in}$
$e_X = e_{TO} \cdot e_{out}$ (Hall multiplication)
$e_{in} = e_N - e_X$ (subtraction at 6)
$e_{in} = e_N - (e_{TO} \cdot e_{out})$
$e_{out} = A_1 (e_N - e_{TO} \cdot e_{out})$
$e_{out} = A_1 e_N - A_1 e_{TO} \cdot e_{out}$
$e_{out} + A_1 e_{TO} \cdot e_{out} = A_1 e_N$
$e_{out}(1 + A_1 e_{TO}) = A_1 e_N$ $$e_{out} = \frac{A_1}{1 + A_1 e_{TO}} \cdot e_N$$

Now if the electrical signal representing the water temperature is adjusted such that $e_{TO} > o$ for all temperature as by using $Ri$ without the diode and $A_1 e_{TO} \gg o$ then it approximately follows that $$e_{out} = \frac{A_1}{A_1 e_{TO}} e_N$$

$$e_{out} = \frac{e_N}{e_{TO}}$$

Note that *division* has occurred by using a *multiplying* device in the feedback path.

Now if we make $$e_{TO} = \frac{1}{Na}$$

as was shown in FIGS. 3 and 4 where $Na$ is the neutron attenuation rate then $e_{out} = e_n \cdot Na$.

Therefore the output voltage as read at meter 10 is the product of the neutron flux and the neutron attenuation rate. This means that my apparatus is measuring the number of neutrons produced within the reactor per unit of cross-sectional area per unit of time as corrected by the attenuation factor.

While the invention has been described mostly in reference to measuring power, it is obvious that the invention has application to any type of measuring equipment including all types of amplifying or multiplying devices as well as measuring merely neutron density.

Accordingly, the scope of my invention is defined in the following claims:

I claim:

1. In nuclear power measuring apparatus, the combination including neutron measuring means, indicating means, amplifying means connecting said measuring means to said indicating means, said amplifying means including a high-gain operational amplifier having a high impedance input and a low impedance output, a semiconductor Hall plate having first and second Hall inputs and a Hall output; means for connecting said Hall plate between said amplifier output and said amplifier input to form a negative feedback impedance whereby a variation in impedance of said Hall plate varies the amplifier gain, said last named means including means for connecting said amplifier output to said first Hall input, and means for connecting said Hall output to said amplifier input; a source of power measuring correction signals, and means for controlling said second Hall input in response to said correction signals for varying said feedback impedance whereby amplifier gain is varied by the correction signals and the amplifier output is the product of the neutrons measured and a variable amplifier gain.

2. A combination as in claim 1 in which said first Hall input includes ohmic connections at opposite end of a Hall plate and in which said Hall output includes ohmic connections at opposite sides of said Hall plate and in which said second Hall input includes a coil and magnetic core for providing a magnetic field perpendicular to the plane surface of said Hall plates and connections.

3. A combination as in claim 1 in which said source of correction signal includes means for sensing the water temperature in said reactor, and in which said means for controlling said second Hall input includes means for generating a signal which is the inverse of the neutron attenuation rate in said water in response to said water temperature.

4. A combination as in claim 1 further including subtraction means having two inputs and an output, means connecting the Hall output voltage to one input of the subtractor and the neutron input signal to the other input of said subtraction means, and means connecting the output of said subtraction means to said amplifier input.

5. Apparatus for measuring the power of a pressurized nuclear water reactor comprising, means for generating a first electrical signal having a value varying directly with measured neutron flux within the reactor, indicator means, a first operational amplifier having a high impedance input and a low impedance output, means including a Hall plate for providing negative feedback from said amplifier output to said amplifier input whereby amplifier gain increases with increase in the impedance of the Hall plate, means for connecting the indicator to said amplifier output, means for connecting the first electrical signal as an input to the input of the amplifier, means for generating a second electrical signal increasing directly with an increase in water temperature within the reactor, said second signal thereby representing the inverse of the neutron attenuation rate by the water within the reactor, a second operational amplifier having a high impedance input, low impedance output, and a feedback impedance between the output and input of said second operational amplifier for providing negative feedback, means for decreasing the input impedance of said second operational amplifier directly with the neutron attenuation rate in response to increases in said water temperature so that the gain of said second operational amplifier increases directly as the neutron attenuation rate decreases, and means for decreasing the impedance of said Hall plate in response to increases in the electrical output of said second operational amplifier.

6. Nuclear reactor power measuring apparatus comprising means for generating a first electrical signal having values representing measured neutron flux within the reactor, a first operational amplifier connected for receiving said first electrical signal and having a high impedance input, a low impedance output and a Hall plate connected from the output to the input as a negative feedback impedance; an indicator means connected to the amplifier output, a second operational amplifier having a high impedance input, a low impedance output and a negative feedback impedance; means for controlling the impedance of said Hall plate in response to the voltage at the output of the second operational amplifier, means for generating a second signal, and means for coupling said second signal to the input of said second amplifier including means for varying the input impedance of said second amplifier automatically in response to the electrical value of said second signal.

7. Electrical apparatus for measuring neutron flux in a neutron attenuating medium comprising:

means including a neutron detector for generating a first electrical signal varying directly in response to variations in measured neutron flux;

electrical indicating means;

operational amplifier means having a high impedance input and a low impedance output;

means for connecting said first electrical signal to said amplifier input and for connecting said amplifier output to said indicating means;

a semiconductor Hall plate having a Hall output and first and second Hall inputs, said second Hall input including magnetic field generating means for varying the impedance of said Hall plate;

means for connecting said Hall plate as a negative feedback impedance from said amplifier output to said amplifier input including means for connecting said amplifier output to said first Hall input and means for connecting said Hall output to said amplifier input;

and means for controlling the magnetic field generating means of said second Hall input including a means for generating a second elecrtical signal having a value varying inversely with variations in the neutron attenuation rate in said medium, whereby the amplifier output represents a product function of measured neutron flux and the neutron attenuation rate.

References Cited by the Examiner

UNITED STATES PATENTS

| 1,822,129 | 9/1931 | Craig | 330—6 |
| 2,814,731 | 11/1957 | Werme | 250—83.1 |
| 2,968,727 | 1/1961 | Otis | 250—83.4 |
| 3,008,083 | 11/1961 | Kuhrt | 324—45 |
| 3,069,545 | 12/1962 | Lide | 250—83.1 |
| 3,189,838 | 6/1965 | Leger | 250—83.1 |

RALPH G. NILSON, *Primary Examiner.*

JAMES W. LAWRENCE, *Examiner.*